(12) United States Patent
Crowley et al.

(10) Patent No.: US 8,497,928 B2
(45) Date of Patent: Jul. 30, 2013

(54) TECHNIQUES TO AUTOMATICALLY FOCUS A DIGITAL CAMERA

(75) Inventors: Matt Crowley, Los Altos, CA (US); Jeff Finkelstein, San Francisco, CA (US); Richard Dellinger, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 394 days.

(21) Appl. No.: 11/831,051

(22) Filed: Jul. 31, 2007

(65) Prior Publication Data

US 2009/0033786 A1  Feb. 5, 2009

(51) Int. Cl.
H04N 5/232 (2006.01)

(52) U.S. Cl.
USPC .................................. 348/345; 348/333.01

(58) Field of Classification Search
USPC ............ 348/14.03, 211.1–211.14, 345, 333.3
See application file for complete search history.

(56) References Cited

U.S. PATENT DOCUMENTS

| | | | | |
|---|---|---|---|---|
| 5,426,732 A * | 6/1995 | Boies et al. | ..................... | 715/839 |
| 6,529,234 B2 * | 3/2003 | Urisaka et al. | ............ | 348/211.99 |
| 6,684,087 B1 * | 1/2004 | Yu et al. | ......................... | 455/566 |
| 6,775,361 B1 * | 8/2004 | Arai et al. | .................. | 379/93.17 |
| 6,812,968 B1 * | 11/2004 | Kermani | ........................ | 348/345 |
| 6,919,927 B1 * | 7/2005 | Hyodo | ..................... | 348/333.02 |
| 6,977,687 B1 * | 12/2005 | Suh | ............................... | 348/345 |
| 7,034,881 B1 * | 4/2006 | Hyodo et al. | ............ | 348/333.12 |
| 7,471,846 B2 * | 12/2008 | Steinberg et al. | ............. | 382/274 |
| 7,643,742 B2 * | 1/2010 | Watanabe et al. | ................ | 396/60 |
| 7,697,057 B2 * | 4/2010 | Yoshida | ......................... | 348/346 |
| 7,791,669 B2 * | 9/2010 | Nonaka | .......................... | 348/349 |
| 7,844,174 B2 * | 11/2010 | Pickens et al. | ................. | 396/121 |
| 2002/0003958 A1 * | 1/2002 | Nagata | ........................... | 396/106 |
| 2002/0080257 A1 | 6/2002 | Blank | | |
| 2003/0064757 A1 * | 4/2003 | Yamadera et al. | ............ | 455/566 |
| 2004/0012709 A1 * | 1/2004 | Hirai | .............................. | 348/345 |
| 2004/0085360 A1 * | 5/2004 | Pratt et al. | ....................... | 345/773 |
| 2004/0189856 A1 * | 9/2004 | Tanaka | ........................... | 348/345 |
| 2004/0189857 A1 * | 9/2004 | Hirai | .............................. | 348/345 |
| 2005/0079896 A1 * | 4/2005 | Kokko et al. | ................... | 455/566 |
| 2005/0140810 A1 * | 6/2005 | Ozawa | ...................... | 348/333.02 |
| 2006/0146174 A1 * | 7/2006 | Hagino | .......................... | 348/349 |
| 2007/0222859 A1 * | 9/2007 | Chang et al. | ................... | 348/148 |
| 2008/0068490 A1 * | 3/2008 | Ueda et al. | ..................... | 348/341 |
| 2008/0079327 A1 * | 4/2008 | Masubuchi | .................... | 348/345 |
| 2008/0284899 A1 * | 11/2008 | Haubmann et al. | ........... | 348/345 |
| 2008/0303922 A1 * | 12/2008 | Chaudhri et al. | ......... | 348/231.99 |
| 2009/0310012 A1 * | 12/2009 | Ueda et al. | ..................... | 348/348 |

* cited by examiner

*Primary Examiner* — Sinh Tran
*Assistant Examiner* — Selam Gebriel

(57) ABSTRACT

Various embodiments are directed to techniques to automatically focus a digital camera. In one or more embodiments, a mobile electronics device may comprise a digital camera having a lens component and lens position component. A display may be coupled to the digital camera to reproduce an image with a first focal point. The digital camera may also include a focal point selection module coupled to the display to select a second focal point for the image and a focus control module coupled to the focal point selection module and the lens position component to provide focus control signals to the lens position component to focus the lens component on the second focal point. Other embodiments are described and claimed.

16 Claims, 4 Drawing Sheets

300

```
┌─────────────────────────────────────┐
│  DISPLAY AN IMAGE WITH A FIRST FOCAL│
│   POINT FROM A DIGITAL CAMERA       │
│                302                  │
└─────────────────────────────────────┘
                  │
                  ▼
┌─────────────────────────────────────┐
│  SELECT A SECOND FOCAL POINT FOR THE│
│               IMAGE                 │
│                304                  │
└─────────────────────────────────────┘
                  │
                  ▼
┌─────────────────────────────────────┐
│   FOCUS THE DIGITAL CAMERA ON THE   │
│         SECOND FOCAL POINT          │
│                306                  │
└─────────────────────────────────────┘
```

FIG. 3

TECHNIQUES TO AUTOMATICALLY FOCUS A DIGITAL CAMERA

BACKGROUND

A digital camera is an electronic device used to capture and store images electronically in a digital format, instead of using photographic film like conventional cameras, or recording images in an analog format to magnetic tape like many video cameras. Modern compact digital cameras are typically multifunctional, with some devices capable of recording sound and/or video as well as still images.

Many digital cameras provide an autofocus feature. Autofocus is a feature that allows a user of a digital camera to obtain the correct focus on a subject rather than requiring the operator to adjust focus manually. Typically a user may assist the camera by determining which area of the photograph to focus on by performing a button half press or other convoluted user interaction to achieve the desired focus. Providing a technique to allow users to more easily determine the area of the photograph they wish to focus on may be desirable. Accordingly, there may be a need for improved techniques to automatically focus a digital camera.

BRIEF DESCRIPTION OF THE DRAWINGS

FIG. 3 illustrates one embodiment of a logic flow.

DETAILED DESCRIPTION

Various embodiments are generally directed to techniques to automatically focus a digital camera. Some embodiments are particularly directed to automatically focusing a digital camera using a display device. The display device may be integrated with, or separate from, the digital camera. In one embodiment, for example, a mobile electronics device may comprise a digital camera having a lens component and lens position component. A display may be coupled to the digital camera to reproduce an image with a first focal point. The digital camera may also include a focal point selection module coupled to the display to select a second focal point for the image. The digital camera may also include a focus control module coupled to the focal point selection module and the lens position component to provide focus control signals to the lens position component to focus the lens component on the second focal point. Other embodiments are described and claimed.

Figure 1:
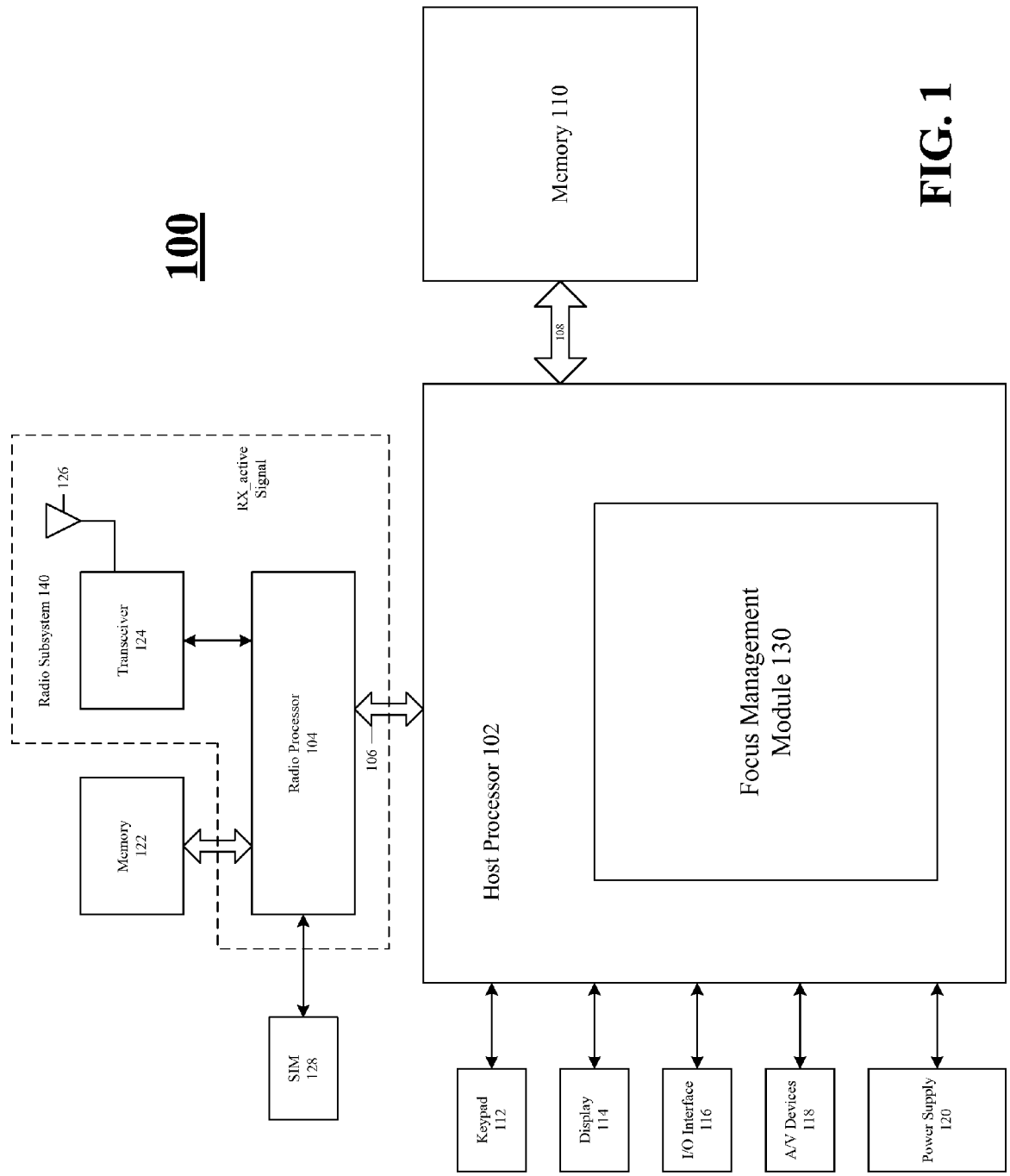
FIG. 1 illustrates one embodiment of a mobile electronic device.

FIG. 1 illustrates a mobile electronic device 100 in accordance with one or more embodiments. The mobile electronic device 100 may be implemented as a combination handheld computer and mobile telephone, sometimes referred to as a smart phone. Examples of smart phones include, for example, Palm® products such as Palm® Treo™ smart phones. Although some embodiments may be described with the mobile electronic device 100 implemented as a smart phone by way of example, it may be appreciated that the embodiments are not limited in this context. For example, the mobile electronic device 100 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth.

The mobile electronic device 100 may provide voice communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth.

In addition to voice communications functionality, the mobile electronic device 100 may be arranged to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth.

The mobile electronic device 100 may be arranged to provide voice and/or data communications functionality in accordance with different types of wireless network systems. Examples of wireless network systems may include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile electronic device 100 may be arranged to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 1, the mobile electronic device 100 may comprise a dual processor architecture including a host processor 102 and a radio processor 104. In various implementations, the host processor 102 and the radio processor 104 may be arranged to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 102 may be responsible for executing various software programs such as system programs and applications programs to provide computing and processing operations for the mobile electronic device 100. The radio processor 104 may be responsible for performing various voice and data communications operations for the mobile electronic device 100 such as transmitting and receiving voice and data information over one or more wireless communications channels. Although some embodiments may be described as comprising a dual processor architecture for purposes of illustration, it is worthy to note that the mobile electronic device 100 may comprise any suitable processor architecture and/or any suitable number of processors consistent with the described embodiments.

The host processor 102 may be implemented as a host central processing unit (CPU) using any suitable processor or logic device, such as a general purpose processor. Although some embodiments may be described with the host processor 102 implemented as a CPU or general purpose processor by way of example, it may be appreciated that the embodiments are not limited in this context. For example, the host processor 102 may comprise, or be implemented as, a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 102 may be coupled through a memory bus 108 to a memory 110. The memory bus 108 may comprise any suitable interface and/or bus architecture for allowing the host processor 102 to access the memory 110. Although the memory 110 may be shown as being separate from the host processor 102 for purposes of illustration, it is worthy to note that in various embodiments some portion or the entire memory 110 may be included on the same integrated circuit as the host processor 102. Alternatively, some portion or the entire memory 110 may be disposed on an integrated circuit or other medium (e.g., hard disk drive) external to the integrated circuit of host processor 102. In various embodiments, the mobile electronic device 100 may comprise an expansion slot to support a multimedia and/or memory card, for example.

The memory 110 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The host processor 102 may also be coupled to various components, such as a keypad 112, a display 114, an input/output (I/O) interface 116, various audio/visual (A % V) devices 118, a power supply 120, and so forth. In some cases, the host processor 102 may further implement a digital interface to communicate digital signals between the host processor 102 and the various coupled components. Examples of such digital signals may include, without limitation, digital clock signals such as from an integrated circuit (IC) clock source. The digital clock signal is typically a signal used to coordinate the actions of two or more circuits. The clock signal oscillates between a high and low state, normally with a fifty percent duty cycle, and is usually a square waveform. Circuits using the clock signal for synchronization may become active at either the rising edge or falling edge, or both, of the oscillating clock signal. Consequently, the host processor 102 typically delivers a clock signal to the various components coupled to the host processor 102 in part to synchronize and control the coupled components.

The mobile electronic device 100 may comprise an alphanumeric keypad 112 coupled to the host processor 102. The keypad 112 may comprise, for example, a QWERTY key layout and an integrated number dial pad. In some cases, the keypad 112 may comprise a thumbboard arranged for operation using the thumbs of a user. The mobile electronic device 100 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth.

The mobile electronic device 100 may comprise a display 114 coupled to the host processor 102. The display 114 may comprise any suitable visual interface for displaying content to a user of the mobile electronic device 100. In one embodiment, for example, the display 114 may be implemented by a LCD such as a touch-sensitive color (e.g., 16-bit color) thin-film transistor (TFT) LCD screen. In some embodiments, the touch-sensitive LCD may be used with a stylus and/or a handwriting recognizer program.

The mobile electronic device 100 may comprise an I/O interface 116 coupled to the host processor 102. The I/O interface 116 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, mobile electronic device 100 may be arranged to transfer and/or synchronize information with the local computer system.

The host processor 102 may be coupled to various A/V devices 118 that support A/V capability of the mobile electronic device 100. Examples of A/V devices 114 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 120 arranged to supply and manage power to the elements of the mobile electronic device 100. In various embodiments, the power supply 120 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for the mobile electronic device 100. For example, the radio processor 104 may be arranged to communicate voice information and/or data information over one or more assigned frequency bands of a wireless communication channel. In various embodiments, the radio processor 104 may be implemented as a communications processor using any suitable processor or logic device, such as a modem processor or baseband processor. Although some embodiments may be described with the radio processor 104 implemented as a modem processor or baseband processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments.

In various embodiments, the radio processor 104 may perform analog and/or digital baseband operations for the mobile electronic device 100. For example, the radio processor 104 may perform digital-to-analog conversion (DAC), analog-to-digital conversion (ADC), modulation, demodulation, encoding, decoding, encryption, decryption, and so forth.

The mobile electronic device 100 may comprise a memory 122 coupled to the radio processor 104. The memory 122 may be implemented using one or more types of machine-readable or computer-readable media capable of storing data such as volatile memory or non-volatile memory, removable or non-removable memory, erasable or non-erasable memory, writeable or re-writeable memory, and so forth. The memory 122 may comprise, for example, flash memory and secure digital (SD) RAM. Although the memory 122 may be shown as being separate from and external to the radio processor 104 for purposes of illustration, it is worthy to note that in various embodiments some portion or the entire memory 122 may be included on the same integrated circuit as the radio processor 104.

The mobile electronic device 100 may comprise a transceiver module 124 coupled to the radio processor 104. The transceiver module 124 may comprise one or more radio transceivers arranged to communicate using different types of protocols, communication ranges, operating power requirements, RF sub-bands, information types (e.g., voice or data), use scenarios, applications, and so forth. In various embodiments, the transceiver module 124 may comprise one or more transceivers arranged to support voice communication for a cellular radiotelephone system such as a GSM, UMTS, and/or CDMA system. The transceiver module 124 also may comprise one or more transceivers arranged to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth. In some embodiments, the transceiver module 124 may comprise a Global Positioning System (GPS) transceiver to support position determination and/or location-based services. It may be appreciated that the term "transceiver" as used herein may describe a transmitter, a receiver, or both a transmitter and receiver.

The transceiver module 124 generally may be implemented using one or more chips as desired for a given implementation. Although the transceiver module 124 may be shown as being separate from and external to the radio processor 104 for purposes of illustration, it is worthy to note that in various embodiments some portion or the entire transceiver module 124 may be included on the same integrated circuit as the radio processor 104. The embodiments are not limited in this context.

The mobile electronic device 100 may comprise an antenna system 126 for transmitting and/or receiving electrical signals. As shown, the antenna system 126 may be coupled to the radio processor 104 through the transceiver module 124. The antenna system 126 may comprise or be implemented as one or more internal antennas and/or external antennas.

The mobile electronic device 100 may comprise a subscriber identity module (SIM) 128 coupled to the radio processor 104. The SIM 128 may comprise, for example, a removable or non-removable smart card arranged to encrypt voice and data transmissions and to store user-specific data for allowing a voice or data communications network to identify and authenticate the user. The SIM 128 also may store data such as personal settings specific to the user.

As mentioned above, the host processor 102 may be arranged to provide processing or computing resources to the mobile electronic device 100. For example, the host processor 102 may be responsible for executing various software programs such as system programs and application programs to provide computing and processing operations for the mobile electronic device 100.

System programs generally may assist in the running of the mobile electronic device 100 and may be directly responsible for controlling, integrating, and managing the individual hardware components of the computer system. Examples of system programs may include, without limitation, an operating system (OS), device drivers, programming tools, utility programs, software libraries, application programming interfaces (APIs), and so forth. The mobile electronic device 100 may utilize any suitable OS in accordance with the described embodiments such as a Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, Mac OS X, and so forth.

Application programs generally may allow a user to accomplish one or more specific tasks. Examples of application programs may include, without limitation, one or more messaging applications (e.g., telephone, voicemail, facsimile, e-mail, IM, SMS, MMS, video conferencing), a web browser application, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. In various implementations, the application programs may provide one or more graphical user interfaces (GUIs) to communicate information between the mobile electronic device 100 and a user. In some embodiments, application programs may comprise upper layer programs running on top of the OS of the host processor 102 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

As show in FIG. 1, the mobile electronic device 100 may comprise or implement a focus management module 130. Focus management module 130 may be arranged to provide automatic focus control to a user. For example, focus management module 130 may be responsible for providing control signals to control one or more of A/V devices 118 of mobile electronic device 100. Although the focus management module 130 may be shown as being implemented on the same integrated circuit as the host processor 102 for purposes of illustration, it is worthy to note that in various embodiments some portion or the entire focus management module 130 may be included separate from the host processor 102. The embodiments are not limited in this context.

Figure 2:
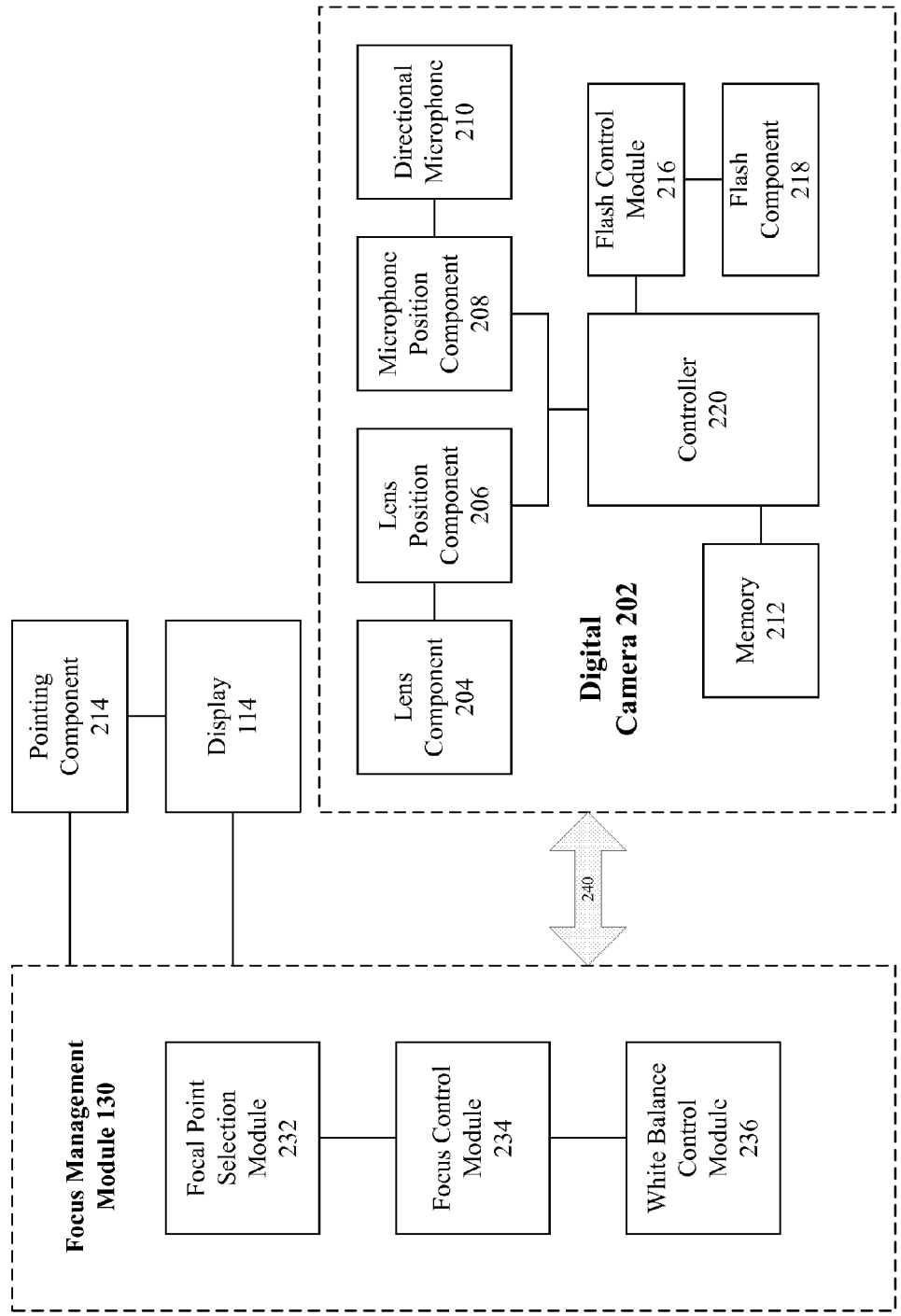
FIG. 2 illustrates one embodiment of a first digital camera.

FIG. 2 illustrates one embodiment of a digital camera system 200. The digital camera system 200 may be representative of, for example, a digital camera system of mobile electronics device 100. Although some embodiments may be described with reference to a digital camera by way of example, it may be appreciated that the principles and techniques may be implemented using various A/V devices 118 and accompanying technology. For example, some embodiments may employ a digital video camera in various implementations.

As shown, digital camera system 200 may comprise or implement focus management module 130, pointing component 214, display 114, digital camera 202 and bus 240. The bus 240 may comprise any suitable interface and/or bus architecture for allowing the digital camera 202 to communicate with focus management module 130. Although focus management module 130 may be shown as being separate from digital camera 202 for purposes of illustration, it is worthy to note that in various embodiments some portion or the entire focus management module 130 may be included on the same integrated circuit as the digital camera 202. Alternatively, some portion or the entire focus management module 130 may be disposed on an integrated circuit or other medium (e.g., hard disk drive) external to the integrated circuit of digital camera 202.

Focus management module 130 may comprise or implement focal point selection module 232, focus control module 234 and white balance control module 236. Digital camera 202 may comprise or implement controller 220, lens component 204, lens position component 206, microphone position component 208, directional microphone 210, memory 212, flash control module 216 and flash component 218. It can be appreciated that a limited number of elements are shown for purposes of illustration and not limitation.

Display 114 of digital camera system 200 may be representative of, for example, display 114 of mobile electronic device 100. The display 114 may comprise any suitable visual interface for displaying content to a user of digital camera system 200. In one embodiment, for example, the display 114 may be implemented by a LCD such as a touch-sensitive color (e.g., 16-bit color) thin-film transistor (TFT) LCD screen. In some embodiments, the touch-sensitive LCD may be used with a stylus or other pointing device. The embodiments are not limited in this context.

Digital camera system 200 may be representative of, for example, one of A/V devices 118 of mobile electronics device 100. In one embodiment, digital camera system 200 may be implemented as an electronic device used to capture and store images electronically in a digital format. Additionally, in some embodiments digital camera system 200 may be capable of recording sound and/or video in addition to still images. The embodiments are not limited in this context.

Digital camera 202 of digital camera system 200 may comprise controller 220. Controller 220 may provide control signals to components of digital camera 202, including lens position component 206, microphone position component 208 and flash control module 216, to provide functionality for digital camera system 200. In some embodiments, controller 220 may also provide control signals to focus management module 130 via bus 240. In one embodiment, controller 220 may be implemented as, for example, host processor 102 of mobile electronics device 100. Alternatively, controller 220 may be implemented as a separate processor from host processor 102. The embodiments are not limited in this context.

Digital camera 202 may further comprise memory 212. Memory 212 may be implemented as, for example, memory 110 of mobile electronics device 100. Although the memory 212 may be shown as being separate from controller 220 for purposes of illustration, it is worthy to note that in various embodiments some portion or the entire memory 212 may be included on the same integrated circuit as controller 220. Alternatively, some portion or the entire memory 212 may be disposed on an integrated circuit or other medium (e.g., hard disk drive) external to the integrated circuit of controller 220.

Focus management module 130 of digital camera system 200 may be representative of, for example, focus management module 130 of mobile electronics device 100. Focus management module 130 may be arranged to provide automatic focus control to a user by, for example, providing control signals to control one or more of lens position component 206, microphone position component 208 and flash control module 216, for example. In some embodiments the focus management module 130 may be implemented on the same integrated circuit as controller 220. In various embodiments some portion or the entire focus management module 130 may be included separate from controller 220. In various embodiments, focus management module 130 may be implemented by one or more hardware components, software components, and/or combination thereof. Focus management module 130 may, for example, be implemented as computer executable instructions stored on memory 212 to be executed by controller 220. The embodiments are not limited in this context.

Digital camera 202 may comprise a lens component 204 and a lens position component 206. Lens component 204 may consist of a photographic or optical lens or assembly of lenses made of a transparent material such as glass, plastic, acrylic or Plexiglass, for example. In one embodiment, the one or more lens elements of lens component 204 may reproduce an image of an object and allow for zooming in or out on the object by mechanically changing the focal length of the lens elements. In various embodiments, digital zoom may be employed in digital camera system 200 to zoom in or out on an image. In some embodiments the one or more lens elements of lens component 204 may be used to focus on different portions of the image by varying the focal length of the lens elements. The desired focus can be obtained with an autofocus feature of digital camera system 200 or by manually focusing on the desired portion of the image, for example.

Lens position component 206 may be configured to receive control signals from controller 220 and focus control module 234 and use this control information to adjust the lens component 204. In various embodiments, the lens position component 206 may be implemented by one or more hardware components, software components, and/or combination thereof. The embodiments are not limited in this context. For example, lens position component may receive control information from controller 220 indicating that a user wishes to focus on a particular portion of an object. Lens position component 206 may use this control information to configure the lens elements of lens component 204 into the proper configuration to deliver the desired focus.

In one embodiment, display 114 of digital camera system 200 may be coupled to digital camera 202 and may be arranged to capture and reproduce an image with a first focal point. The image may be viewed through lens component 204 and reproduced on display 114. The image on display 114 may comprise a substantially real-time preview of the image to allow for framing and previewing before capturing a photograph. In some embodiments, the focal point refers to the intended center of interest of a photograph and is typically the point where the image will be in the clearest focus.

Focal point selection module 232 may be coupled to the display 114 and may allow for the selection of a second focal point for the image. The second focal point may be selected, for example, by an operator using the display 114 to indicate that a second focal point is desired. In some embodiments, for example, display 114 may comprise a touchscreen display and may be configured to send coordinates for the second focal point to the focal point selection module 232. These coordinates, which may in one example comprise X, Y coordinates, may correspond to pressure applied to an area of the display 114. Pressure may be applied to the display 114 by any suitable input device, including a stylus or a finger, for example, and this pressure may be digitized to represent the coordinates. The embodiments are not limited in this context.

Focus control module 234 may be coupled to the focal point selection module 232 and the lens position component 206 to provide focus control signals to the lens position component 206 to focus the lens component 204 on the second focal point. In various embodiments, the focus control signals may represent a focal length for the lens component 204. In some embodiments, focus control module 234 may determine the focal length for lens component 204 based on the coordinates for the second focal point determined by focal point selection module 232. Lens position component 206 may use the control signals from focus control module 234 to adjust the lens elements of lens component 204 to achieve the desired focus on the second focal point.

The digital camera system 200 may further comprise a pointing component 214 coupled to the display 114 and the focal point selection module 232. The pointing component 214 may be configured to control a pointer on the display 114 in response to user or operator commands. The pointing component 214 may send coordinates for the second focal point to the focal point selection module 232. The coordinates may correspond to a position for the pointer on the display 114. In various embodiments the pointer may comprise any overlay image on display 114 that is capable of indicated the currently selected area or focal point. For example, the pointer may include an arrow, box, circle, oval or any other suitable image. The overlay image may have varying degrees of translucency as desired for a given implementation.

In some embodiments, the digital camera system 200 may comprise a directional microphone 210 and a microphone position component 208 coupled to the focus control module 234. In various embodiments, the focus control module 234 may provide focus control signals to the microphone position component 208 to focus the directional microphone 210 on the second focal point. For example, focus control module 234 may provide coordinates to microphone position component 208. Microphone position component 208 may use the coordinates to focus directional microphone 210 on the sound emanating from the focal point defined by the coordinates.

Directional microphone 210 may consist of one or more microphones whose response varies with the direction of sound incidence. In one embodiment, directional microphone 210 may be implemented as a digital directional microphone capable of creating null points at different frequencies to cancel various sounds around a desired focal point. In various embodiments, the microphone position component 208 may be implemented by one or more hardware components, software components, and/or combination thereof. The embodiments are not limited in this context.

In some embodiments, the digital camera system 200 may comprise a white balance control module 236 coupled to the focal point selection module 232. The white balance control module 236 may be configured to modify a white balance setting value for the image based on the second focal point. In various embodiments, white balance control module 236 may be implemented by one or more hardware components, software components, and/or combination thereof. White balance control may refer to the adjustment of the relative amounts of red, green, and blue primary colors in an image such that neutral colors are reproduced correctly. Changing the white balance may change the overall mixture of colors in an image and can be used for generalized color correction.

Flash component 218 and flash control module 216 of digital camera system 200 may be coupled to the focal point selection module 232 and/or controller 220. The flash control module 216 may be configured to select a flash level value representing flash intensity for the flash component 218 based on the second focal point. In various embodiments, the flash control module 216 may be implemented by one or more hardware components, software components, and/or combination thereof. Flash component 218 may consist of a device or group of devices that produce an instantaneous flash of light, typically around $\frac{1}{3000}$ of a second at a color temperature of about 5500K, to help illuminate a scene. Flash component 218 may be used, for example, to aid in capturing images of quickly moving objects, to create a different temperature light than the ambient light, and to illuminate scenes that do not have enough available light to adequately expose the image.

Operations for the mobile electronic device 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using any desired hardware elements, software elements, or combination of both.

FIG. 3 illustrates a logic flow 300. Logic flow 300 may be representative of the operations executed by one or more embodiments described herein. The logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic comprising instructions, data, and/or code to be executed by a logic device. For purposes of illustration, and not limitation, the logic flow 300 is described with reference to FIGS. 1 and 2. The embodiments are not limited in this context.

As shown in FIG. 3, the logic flow 300 may comprise displaying an image with a first focal point from a digital camera at block 302. The image may be displayed with a touchscreen display such as, for example, display 114 of mobile electronics device 100.

The logic flow 300 may further comprise selecting a second focal point for the image at block 304. The selection of the second focal point for the image may be performed using a touchscreen display. The touchscreen display may be, for example, display 114 of mobile electronic device 100.

At block 306, logic flow 300 may comprise focusing the digital camera on the second focal point. Focusing the digital camera on the second focal point may further comprise generating a set of coordinates for the second focal point and focusing a lens for the digital camera on the second focal point.

In various embodiments, a directional microphone may be focused on the second focal point and/or a flash level value representing flash intensity for a flash component may be selected based on the second focal point.

In some embodiments, the image may be captured using a touchscreen display. Capturing the image using a touchscreen display may comprise a user applying pressure to the touchscreen display to indicate that the image on the display is ready to be committed to memory. Capturing the image, for example, may require a double tap on the touchscreen display or pressure applied to the touchscreen display in the area of the selected second focal point.

The digital camera may be capable of zooming in or out on the image displayed on the touchscreen display in various embodiments. For example, a user may desire to zoom in on an object to focus a photograph on a specific element of the object. In some embodiments, the user may accomplish this goal by applying pressure to the touchscreen display in the area where the user wishes to zoom, similar to the way in which a second focal point is selected. Alternatively, a user may slide a pointer across the touchscreen display to zoom in or out on the object. User interface or graphic user interface (GUI) elements may be implemented and shown by the display 114 to provide zoom controls and information.

In various embodiments, a user may edit or crop the image on the touchscreen display by manipulating the image using the touchscreen display. For example, a user who wishes to crop an image may use the touchscreen display to indicate the desired size of the cropped image by sliding the corners of the image to the desired position. As with zoom controls, a GUI may be implemented for the cropping operations.

Figure 4:
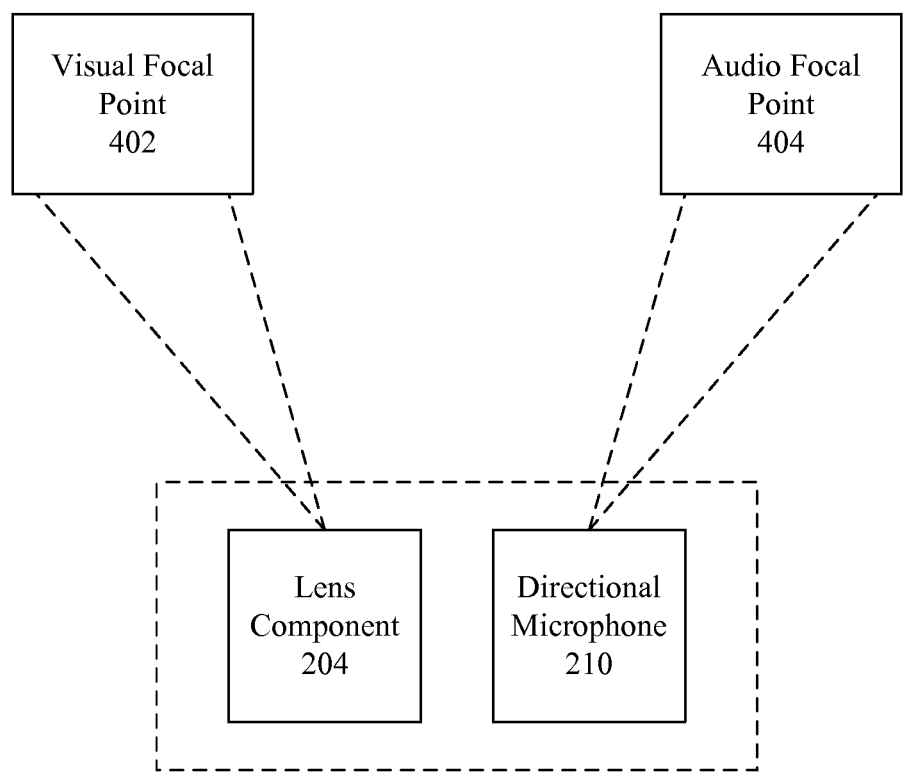
FIG. 4 illustrates one embodiment of a second digital camera.

FIG. 4 illustrates one embodiment of a digital camera system 400. The digital camera system 400 may be representative of, for example, digital camera system 200. As shown, digital camera system 400 may comprise or implement lens component 204, directional microphone 210, visual focal point 402 and audio focal point 404. It can be appreciated that a limited number of elements are shown for purposes of illustration and not limitation.

A mobile electronic device 100 may comprise a digital camera 200 having a lens component 204 and lens position component 206, and a directional microphone 210 and a microphone position component 208. A display 114 may be coupled to the digital camera 200 to reproduce an image from the digital camera 200 with a first focal point. A focal point selection module 232 may be coupled to the display 114 to select a second and a third focal point for the image. A focus control module 234 may be coupled to the focal point selection module 232 and the lens position component 206 and microphone position component 208 to provide focus control signals to the lens position component 206 and the microphone position component 208. The focus control signals may be used to focus the lens component 204 on the second focal point and the directional microphone 210 on the third focal point, for example.

In one embodiment, the second focal point may comprise visual focal point 402. Visual focal point 402 may comprise, for example, an object that a user desires to focus on when capturing a digital image. In one embodiment, the third focal point may comprise audio focal point 404. Audio focal point 404 may comprise a sound or series of sounds, such as the voice of an individual that a user desires to focus on when capturing a digital video, for example. In various embodiments, the visual focal point 402 and the audio focal point 404 may be located remotely from each other.

In one embodiment, directional microphone 210 may be configured to track audio focal point 404 as the position of audio focal point 404 changes. For example, if the selected audio focal point 404 comprises the voice of an individual located in a first position, the individual may move to a second, remote position, and the directional microphone 210 may be configured to follow the voice of the individual to the second position without requiring the user to physically change the position of the digital camera. Tracking an audio focal point 404 may be implemented by any suitable means known in the art, such as sound source localization, for example.

The embodiment described in FIG. 4 may be applicable if a user desires to record a digital video with different audio and video focal points. For example, a user may desire to record a digital video of a waterfall while another individual standing nearby describes the waterfall. In this example, the user may wish to select the waterfall as the visual focal point 402 and the individual describing the scene as the audio focal point 404. In this embodiment, the quality of the recorded digital video may be increased as a result of increased options presented to the user.

A user of a mobile electronic device may desire to capture a digital photograph of a friend standing near a waterfall with a digital camera contained in a mobile electronic device. To view the desired image, the user points the lens of the camera of the mobile electronic device in the direction of the friend and an image is displayed on the touchscreen display of the mobile electronic device. The intended focal point of the image is the face of the friend. However, the digital camera may originally set the default focal point as the waterfall, for example.

In the above described embodiments, the user need only tap the portion of the touchscreen display of the mobile electronic device to set the focal point on a different, desired location. In the given example, the user may tap the touchscreen display in the area of the face of their friend to change the focal point away from the waterfall. In various embodiments the user may also capture the image by tapping the touchscreen a second time or by performing a double tap on the touchscreen. The image may also be captured using the various buttons on the mobile electronic device, including a five way center button press, for example.

If, for example, the user in the same situation desired to record a digital video of their friend and the waterfall using the mobile electronic device, the touchscreen display could be used to continually change the focal point of the video in a manner similar to that described above. Additionally, the touchscreen display could be utilized to control a directional microphone of the mobile electronic device. For example, if the intended video target is the waterfall that is several yards away from the user, and a group of individuals carrying on a conversation are standing near the user, the user could use the touchscreen display to indicate that the sound of the waterfall, and not the conversation of the members of the nearby group, are the intended audio target. As described above, a user may also wish to select different audio and visual focal points. The above described embodiments may provide a user with enhanced ease of operation and may help to ensure better picture quality and a better photographic experience.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the scope of the embodiments.

The invention claimed is:

1. A mobile electronic device, comprising:
   a lens component coupled to a lens position component;
   a touchscreen display to display an image having a first focal point; and
   one or more processors to provide:
      a focal point selection module to receive a user input of a first type to select a second focal point, the second focal point corresponding to a location on the image displayed on the touchscreen display;
      a focus control module coupled to the focal point selection module to provide one or more focus control signals to the lens position component in order to cause the lens position component to focus the lens component from the first focal point to the second focal point while the image is being displayed;
      a flash component coupled to a flash control module, wherein the flash control module is configured to select a flash level value representing a flash intensity for the flash component based on the second focal point; and
   wherein the one or more processors captures the image, based on the flash level value, in response to a second type of user input on the touchscreen display, the second type of user input being different than the first type of user input.

2. The mobile electronic device of claim 1, wherein the touchscreen display sends coordinates for the second focal point to the focal point selection module, the coordinates corresponding to the location of the first type of user input on the touchscreen display.

3. The mobile electronic device of claim 1, wherein the one or more processors is further configured to provide a pointing component to control a pointer on the touchscreen display, a location of the pointer on the touchscreen display corresponding to the second focal point.

4. The mobile electronic device of claim 1, wherein the focus control signals designate a focal length for the lens component.

5. The mobile electronic device of claim 1, further comprising a directional microphone component, and wherein the focus control module is configured to provide focus control signals to focus the directional microphone component on the second focal point.

6. The mobile electronic device of claim 1, wherein the one or more processors is further configured to provide a white balance control module, the white balance control module being configured to modify a white balance setting value for the image based on the second focal point.

7. A method for operating a mobile device, the method being performed by one or more processors and comprising:
   displaying, on a touchscreen display, an image having a first focal point, the image being provided by a lens component;
   selecting a second focal point for the image in response to receiving a first type of user input on the touchscreen display, the second focal point corresponding to a location on the image displayed on the touchscreen display;
   focusing the lens component from the first focal point to the second focal point while the image is being displayed;
   selecting a flash level value representing a flash intensity for a flash component based on the second focal point; and
   capturing the image, based on the flash level value, in response to a second type of user input on the touchscreen display, the second type of user input being different than the first type of user input.

8. The method of claim 7, wherein focusing the lens component on the second focal point includes generating a set of coordinates for the second focal point.

9. The method of claim 7, wherein focusing the lens component on the second focal point includes focusing a directional microphone component on the second focal point.

10. A non-transitory computer readable storage medium storing instructions, the instructions when executed by one or more processors cause the one or more processors to perform a method comprising:
- displaying, on a touchscreen display, an image having a first focal point, the image being provided by a lens component;
- selecting a second focal point for the image in response to a first type of user input on the touchscreen display, the second focal point corresponding to a location on the image displayed on the touchscreen display;
- focusing the lens component from the first focal point to the second focal point while the image is being displayed;
- selecting a flash level value representing a flash intensity for a flash component based on the second focal point; and
- capturing the image, based on the flash level value, in response to a second type of user input on the touchscreen display, the second type of user input being different than the first type of user input.

11. The storage medium of claim 10, wherein focusing the lens component on the second focal point includes generating a set of coordinates for the second focal point.

12. The storage medium of claim 10, wherein focusing the lens component on the second focal point includes focusing a directional microphone component on the second focal point.

13. The storage medium of claim 10, wherein the instructions when executed by the one or more processors cause the one or more processors to perform a method further comprising modifying a white balance setting value for the image based on the second focal point.

14. A mobile electronic device, comprising:
- a lens component;
- a touchscreen display to display an image having a first visual focal point;
- a directional microphone component; and
- one or more processors coupled to the lens component, the touchscreen display, and the directional microphone component, the one or more processors being configured to provide:
  - a focal point selection module to select a second visual focal point and an audio focal point for the image, wherein the second visual focal point and the audio focal point correspond to different portions of the image; and
  - a focus control module coupled to the focal point selection module to (i) provide focus control signals to the lens component in order to change a focus of the lens component from the first visual focal point to the second visual focal point, and (ii) provide focus control signals to the directional microphone component in order to focus the directional microphone component on a target, in the image, of the audio focal point, while continuing to display the image on the touchscreen display.

15. The mobile electronic device of claim 14, wherein the directional microphone component is configured to track the audio focal point as a position of the audio focal point changes.

16. The mobile electronic device of claim 1, wherein the first type of input includes a single tap, and wherein the second type of input includes a double tap.

* * * * *